Figure 1:
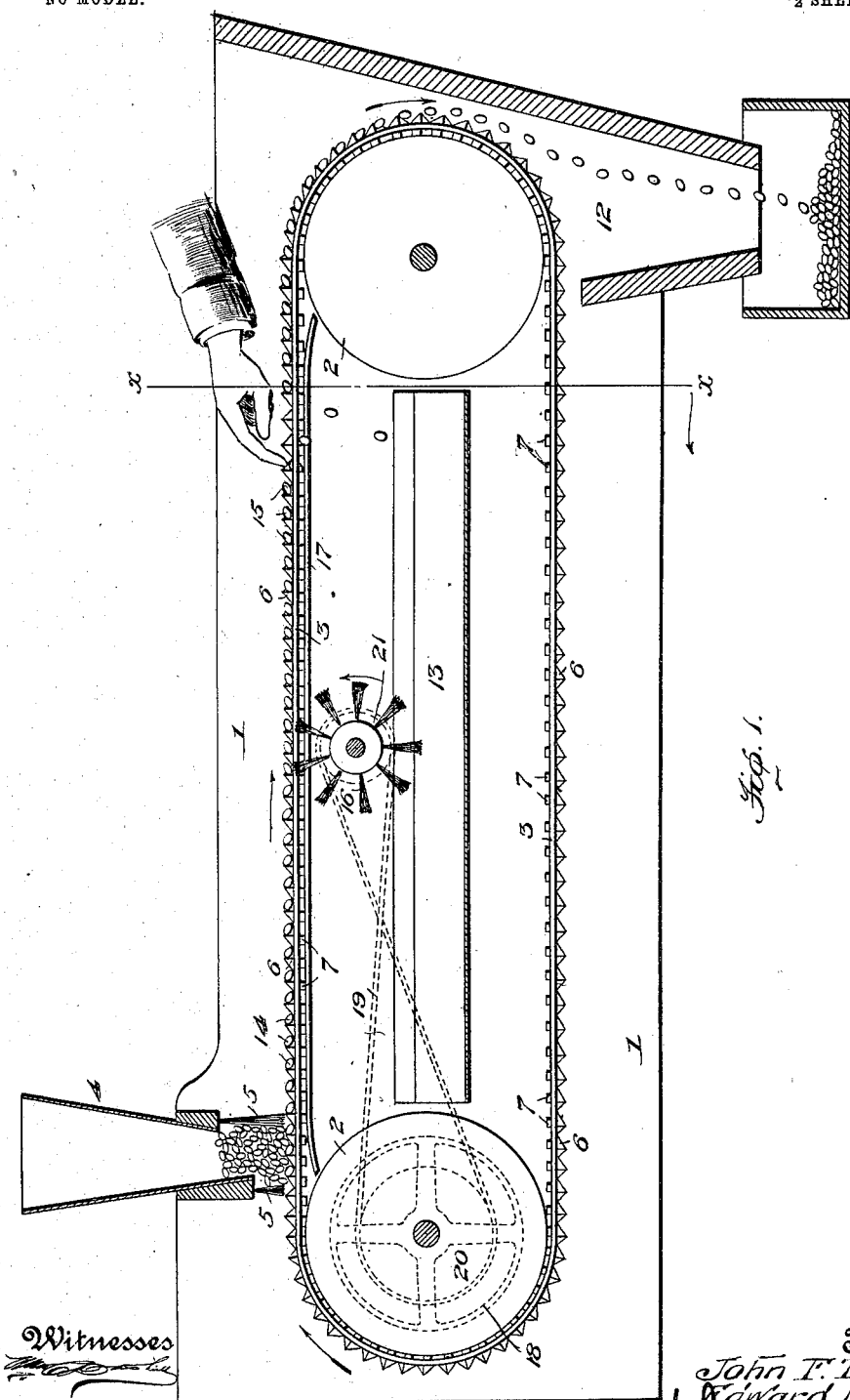

No. 731,722. PATENTED JUNE 23, 1903.
J. F. TURNER & E. BURNETT.
MACHINE FOR PICKING BEANS.
APPLICATION FILED JAN. 10, 1903.
NO MODEL. 2 SHEETS—SHEET 1.

Witnesses
Inventors
John F. Turner
Edward Burnett
by Johnson & Johnson
Attorneys No. 731,722. PATENTED JUNE 23, 1903.
J. F. TURNER & E. BURNETT.
MACHINE FOR PICKING BEANS.
APPLICATION FILED JAN. 10, 1903.
NO MODEL. 2 SHEETS—SHEET 2.
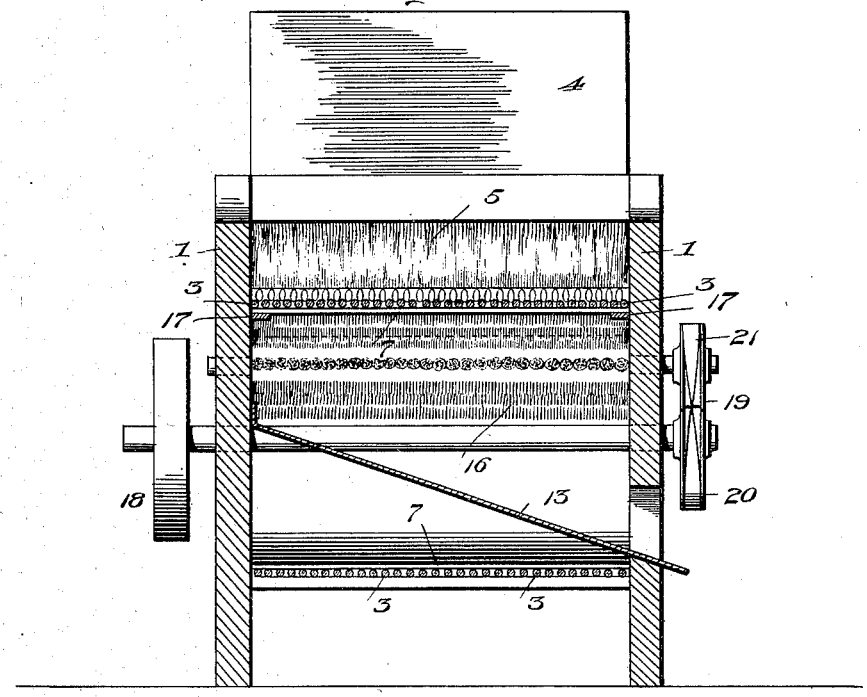
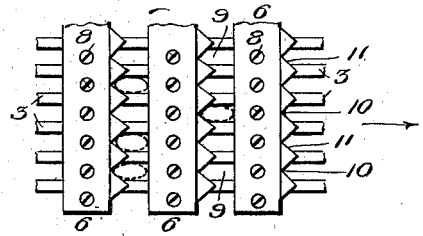
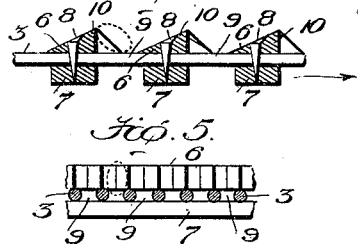
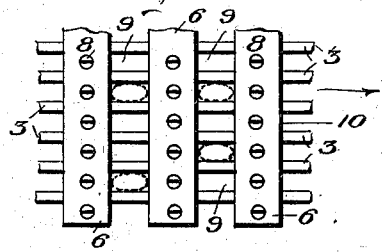
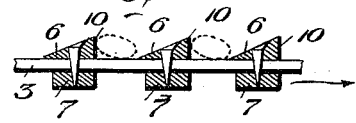
Witnesses
Inventors
John F. Turner
Edward Burnett
by Johnson & Johnson
Attorneys No. 731,722. Patented June 23, 1903.

UNITED STATES PATENT OFFICE.

JOHN F. TURNER AND EDWARD BURNETT, OF CLIFFORD, MICHIGAN.

MACHINE FOR PICKING BEANS.

SPECIFICATION forming part of Letters Patent No. 731,722, dated June 23, 1903.

Application filed January 10, 1903. Serial No. 138,504. (No model.)

*To all whom it may concern:*

Be it known that we, JOHN F. TURNER and EDWARD BURNETT, citizens of the United States, residing at Clifford, in the county of Lapeer and State of Michigan, have invented certain new and useful Improvements in Machines for Picking Beans, of which the following is a specification.

The invention herein is directed to the production of a machine for picking beans by hand to separate the bad from the good; and the improvement consists of parts which will be pointed out in the claims appended hereto, in connection with the accompanying drawings, in which—

Figure 1 represents in vertical longitudinal section a machine adapted for picking bad beans by hand from an endless traveling belt, wherein is illustrated the new mode of picking by the pressure of the finger upon each individual bad bean to dislodge it from the belt, and thereby separate the bad from the good beans. Fig. 2 is a transverse section of the same. Fig. 3 shows in top view, enlarged, a portion of the endless picking-belt of elastic open pockets and the position the bean assumes for dislodgment from the elastic pocket by hand-pressure. Fig. 4 is a vertical section of the same. Fig. 5 is a cross-section of the same. Figs. 6 and 7 show views identical with Figs. 3 and 4, respectively, of a modification.

Between the vertical sides of a suitable frame is mounted a pair of rolls 2 2, one at each end and of equal diameter, their axis being in the same horizontal plane. On and around these rolls is fitted an endless traveling picking-belt composed of a plurality of rubber cords 3, connected together in parallel relation by means which form the surface of the belt into contiguous transverse rows of open elastic pockets, into which the beans from a feed-hopper 4 find a separate seat for each and from which the bad beans are dislodged by the pressure of the finger of an attendant. For a bean-picking belt its width may be from eight to ten inches wide and the space between the strands about an eighth of an inch, and with this width the endless cords are clamped in parallel relation to each other by strips in pairs fixed crosswise to the cords, one on the upper side and one on the under side of each pair. The strips in pairs are thus arranged, so as to clamp the cords between them, the strips on the under side of the belt being of wood, the strips on the upper side of the belt being preferably of leather and less liable to bruise the beans. The cords are clamped sufficiently tight to prevent slipping, and for this purpose it is preferred to fasten the strips together by a pair of screws 8 to each cord, as seen in Figs. 3 and 4. The leather strips we prefer to make about a half-inch wide, of rectangular form with inclined upper faces, having one of its flat sides fastened upon the cords, and therefore presenting its upper side a double incline for the easy movement of the beans into open pockets 9, Fig. 3, formed in transverse rows by the cords and between each pair of leather strips. The lower edges of the leather strips are in the plane of the cords, so that in passing under the hopper-brushes 5 the belt forms the bottom of the hopper, and the double inclines of each pair of leather strips will allow the beans to roll over one face of the incline and fill the rows of open elastic pockets at the other side of the incline. In thus forming the cords into rows of open elastic pockets between transverse strips that side of each strip which stands forward in the direction of the travel of the belt preferably forms a shoulder 10 at right angles to the surface formed by the clamped cords, and this shouldered side is preferably formed with saw-tooth notches, as in Figs. 3 and 4, the tooth projections at their apices coinciding with each cord, so that each row of elastic pockets is formed by the elastic cords between the straight edge of one strip and the toothed edge of the contiguous strip, whereby it is easy to seat a row of beans in each transverse row of elastic pockets.

In the operation of the brush it is important to note that the shoulder of the strip serves to hold the bean while being turned over by the brush. The collection of beans in this way from a hopper upon a belt-surface of transverse rows of elastic open pockets renders it easy for an attendant standing by the belt to see and dislodge each bad bean from each row by pressing it with his finger down between the elastic cords, constituting thereby the machine as a hand-picker for separating the bad from the good beans quickly and collecting the bad and the good beans from the belt into separate receptacles. For this purpose a receiving-hopper 12 is provided for the good beans at the delivery end of the picking-belt, and a receiving hopper or chute 13 is provided for the bad or culled beans beneath the belt. The belt in its movement beneath the hopper and by the action of the hopper inner row of brushes tends to leave the beans standing in the pockets toward and against the shoulder of the strip between its edge teeth, as shown at 14 in Fig. 1, and in this position the beans can be picked and dislodged from the belt; but a more perfect picking is afforded by having the beans turned over, so as to lie toward the feather-edge or inclined face of the straight edge of the strip, as at 15, and for this purpose a rotary brush 16 is transversely mounted in the frames beneath the belt and in such relation thereto that the brush will penetrate between the cords and will so act upon the beans as to cause them to be turned over from the position in which they are placed by the hopper-brush, and thereby place the beans in the best position for dislodgment from the pockets formed between the strips and between the cords, the brush in this operation rotating in a direction opposite to the travel of the belt.

After leaving the hopper-brush the beans may not show all the defective ones, but the rotary brush in turning the beans over may show other bad beans.

The inner walls of the frame sides are provided with ways 17, on which the belt rests and moves, while that roll at the hopper end of the belt has a power-driven pulley 18 or a crank for driving the belt, the rotary brush being driven by a belt 19 from a pulley 20 on the other end of the roll, and the pulleys 20 and 21 are so proportioned as to cause a comparatively fast movement of the rotary brush with a slow movement of the picking-belt. Looking at Figs. 6 and 7 it is seen that the beans are seated and held in the open elastic pockets between the leather strips without the toothed edge, and therefore have an upper face inclining toward the feed-hopper and a right-angle shoulder engaging and carrying the beans out of the hopper.

While we have described a bean-picking belt of a preferred size, obviously the belt-pockets may be adapted for Lima or for small beans, potatoes, apples, or for other fruit, and for this purpose the size of the machine will be made to suit the work. Obviously one of the rolls may be made adjustable.

We claim—

1. A bean-picking belt composed of a plurality of endless rubber cords in parallel separated relation and transverse strips fastened in pairs to the rubber cords, the spaces formed by and between the said cords and the edges of the strips forming a surface of openings expansible only between the cords.

2. In a bean-picking machine, the combination of an endless belt of a plurality of rubber cords and transverse strips fastened together in pairs with the cords clamped between them forming a surface of transverse rows of open pockets, rolls supporting the belt, and a feed-hopper having brushes adapted to engage the strips of the belt.

3. A bean-picking belt formed of a plurality of endless rubber cords and transverse strips in pairs fastened together with the cords clamped between them and forming a surface of transverse rows of open elastic pockets, the outer strips having their outer sides beveled downward toward the hopper, the forward edges of the strips engaging the beans in the pockets in the way stated.

4. A bean-picking belt formed of a plurality of endless rubber cords and transverse strips in pairs fastened together with the cord clamped between them and forming a surface of transverse rows of open elastic pockets, the outer strips beveled toward the hopper and toward the discharge, and having their forward edges of saw-tooth formation, the point of each coincident with a cord and forming thereby shouldered recesses corresponding with the elastic pockets in which the beans are carried.

5. An endless bean-picking surface composed of rubber cords and transverse strips having their forward edges of saw-tooth formation, the points of the teeth coinciding with the cords whereby to form elastic pockets between the cords and the strips.

6. In a bean-picking machine and in combination, an endless belt of a plurality of rubber cords and transverse strips forming a surface of transverse rows of open elastic pockets, rolls supporting the belt, a feed-hopper having brushes adapted to engage the strips of the belt and a brush mounted to engage the inner side of the belt between the hopper and the discharge end of the belt, and rotating in a direction opposite to the travel of the latter.

7. In a bean-picking machine and in combination, an endless belt forming a platform of a plurality of cords and transverse strips forming transverse rows of open pockets, a feed-hopper having brushes engaging the strips, a brush engaging the under side of the belt and rotating in a direction opposite to its travel and means for rotating the belt.

8. A bean-picking belt composed of rubber cords in parallel separated relation, and strips fastened crosswise on the top surface of the cords in parallel separated relation, the spaces bounded by the rubber cords and the edges of the strips being expansible only between the cords.

In testimony whereof we affix our signatures in presence of two witnesses.

JOHN F. TURNER.
EDWARD BURNETT.

Witnesses:
WILLARD T. MILLER,
JOHN H. WHITTAKER.